United States Patent [19]
Kaufman

[11] Patent Number: 5,903,870
[45] Date of Patent: *May 11, 1999

[54] VOICE RECOGNITION AND DISPLAY DEVICE APPARATUS AND METHOD

[75] Inventor: Eric R. Kaufman, Emerson, N.J.

[73] Assignee: Vis Tell, Inc., Emerson, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/529,765

[22] Filed: Sep. 18, 1995

[51] Int. Cl.$^6$ .................................................. G10L 7/08
[52] U.S. Cl. .......................................................... 704/275
[58] Field of Search .............................. 395/2.79, 2.84, 395/2.56, 2.59, 2.6, 2.61, 2.4; 704/270, 275, 246, 247, 251, 250, 252, 255, 231, 200

[56] References Cited

U.S. PATENT DOCUMENTS

| | | | |
|---|---|---|---|
| 3,833,764 | 9/1974 | Taylor | 178/7.5 D |
| 4,393,271 | 7/1983 | Fujinami et al. | 179/1 SM |
| 4,521,870 | 6/1985 | Babbel et al. | 364/900 |
| 4,538,183 | 8/1985 | Kanno et al. | 358/280 |
| 4,677,569 | 6/1987 | Nakano et al. | 364/513.5 |
| 4,704,696 | 11/1987 | Reimer et al. | 364/513.5 |
| 4,726,065 | 2/1988 | Froessl | 381/41 |
| 4,761,641 | 8/1988 | Schreiber | 345/1 |
| 4,761,642 | 8/1988 | Huntzinger | 340/721 |
| 4,776,016 | 10/1988 | Hansen | 381/42 |
| 4,819,189 | 4/1989 | Kikuchi et al. | 364/521 |
| 4,896,347 | 1/1990 | Auber | 379/96 |
| 5,006,987 | 4/1991 | Harless | 364/419 |
| 5,091,866 | 2/1992 | Takagi | 395/158 |
| 5,276,796 | 1/1994 | Yamada et al. | 395/343 |
| 5,377,303 | 12/1994 | Firman | 395/2.84 |

FOREIGN PATENT DOCUMENTS

| | | | |
|---|---|---|---|
| 63-209398 | 2/1990 | Japan | G09G 5/36 |
| 63-246493 | 4/1990 | Japan | H04N 5/68 |

OTHER PUBLICATIONS

Schmandt, Hulteen, "The Intelligent Voice Interactive Interface", Proceedings from Human Factors in Computer Systems, Mar. 15–17, 1982, pp. 363–366.

James L. Flanagan, "Speech Communication –An Overview", from *Voice Communications between Humans and Machines*, David B. Roe and Jay G. Wilpon, National Academy of Sciences ISBN 0–309–04988–1, pp. 76–103.

Annual Report for Projectavision, Inc., for Fiscal year ending Dec. 31, 1993, p 8.

John F. Ritter, Office of Corporate Liaison and Technology Transfer, Rutgers University, New Jersey, "Speech/Speaker Recognition and Microphone Array Technologies".

Gordon E. Pelton, *Voice Processing*, McGraw–Hill, ISBN 0–07–049309 Copy of relevant pages not available.

Computer, vol. 2, Schamndt et al., "Augmenting a window system with speech input". Aug. 1990.

IEEE Comput. Soc. Press, Alho et al., "An approach for supporting inter–application consistency" pp. 222–228. Apr. 1993.

*Primary Examiner*—Richemond Dorvil
*Attorney, Agent, or Firm*—Walter J. Tencza, Jr.

[57] ABSTRACT

A speech transducer, a processor, and a display device are provided. The display device comprises a screen. The processor produces a plurality of windows on the screen at the same time, at least two of the windows comprised of different types of data. The processor also receives a speech signal from the speech transducer and modifies a parameter of one or more of the windows based on the speech signals. A plurality of data sources are provided at least two of which produce different types of data. Preferably one or more windows each comprising data from a different data source, are produced on the screen at the same time. The windows on the screen are arranged in a grid comprised of a plurality of rows and a plurality of columns. The processor includes a voice input device for translating speech electrical signals into language signals and a language device for implementing language signals to modify a window on the screen of the display device.

20 Claims, 6 Drawing Sheets

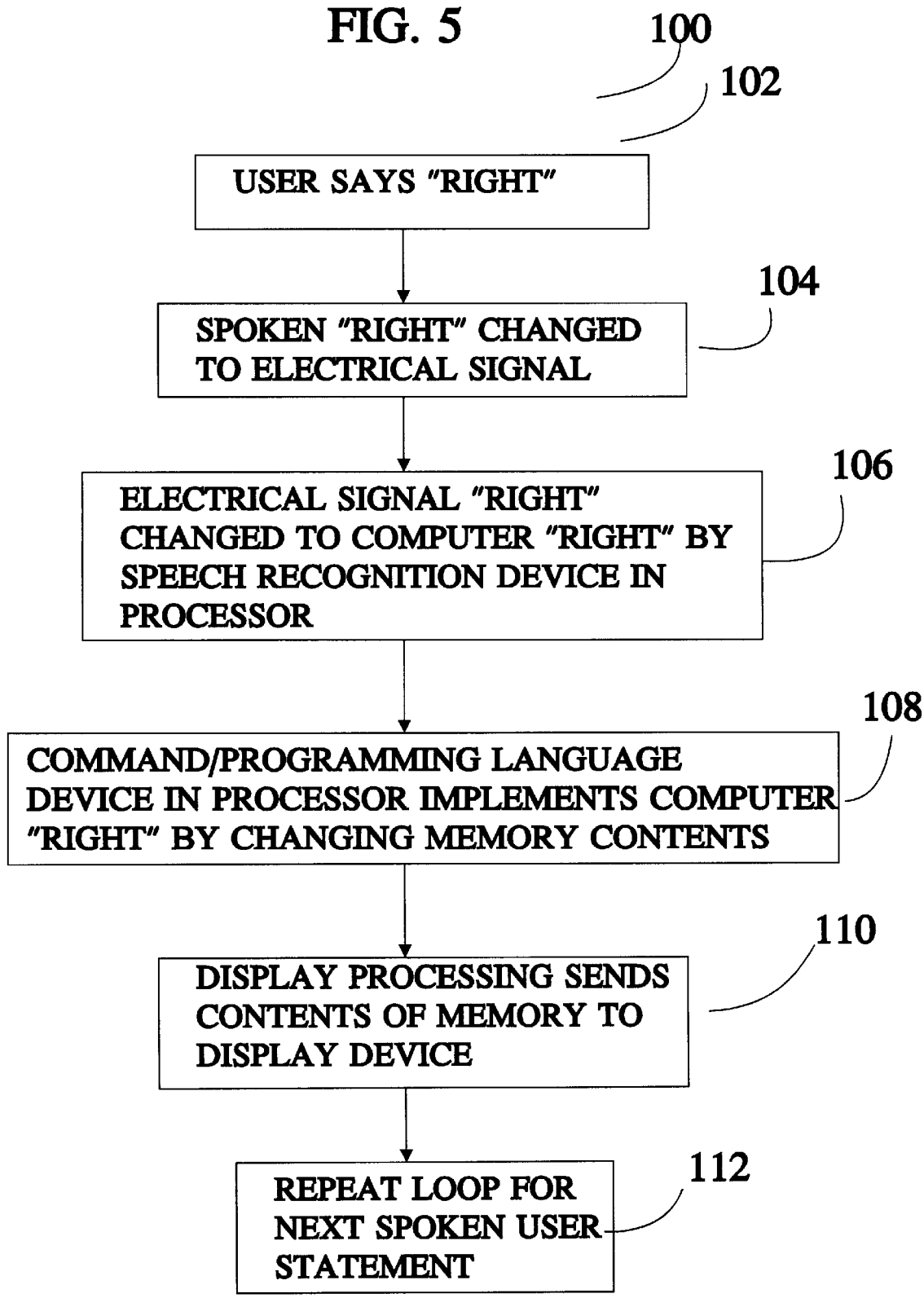

VOICE RECOGNITION AND DISPLAY DEVICE APPARATUS AND METHOD

FIELD OF THE INVENTION

The present invention relates to the field of voice recognition and more particularly to voice recognition and displaying of information on a screen in response to spoken utterances.

BACKGROUND OF THE INVENTION

Voice recognition technology in conjunction with the displaying of information on a screen has been used to a very limited extent in the prior art.

U.S. Pat. No. 4,726,065 to Froessl discloses a speech recognition unit 36. Speech is delivered from the speech recognition unit 36 to an assembler 38 which implements the instructions by causing the display 26 to perform a task. (Col. 3, lns. 30–46, FIG. 1). A touch screen is provided and claimed to identify a location of the screen and voice commands provide instruction. (Cols. 3–4, lns. 64—ln. 10.) A grid system is also provided. However, the grid is of a single image, and a portion of it can be enlarged by a voice command, such as "C3full screen".

An article entitled "The Intelligent Voice-Interactive Interface" discloses the movement and modification of "ships" on a large display screen by pointing and talking.

"Windows" a software product developed by Microsoft, provides overlapping windows on a computer screen with various data in response to commands from a keyboard.

SUMMARY OF THE INVENTION

The present invention in one embodiment comprises a speech transducer, a processor, and a display device. The display device typically comprises a screen. The processor is adapted for producing a plurality of windows on the screen at the same time, at least two of the windows comprised of different types of data. The processor also receives speech signals from the speech transducer and modifies a parameter of one or more of the windows on the screen based on the speech signals. Parameters such as the data within the windows or the size of windows can be modified.

The display device is typically comprised of a rear screen projector or a front screen projector. The rear or front screen projector is preferably either a liquid crystal display or a cathode ray tube rear or front screen projector. The screen of the display device is preferably at least five feet diagonal or at least three feet in length (or height) and four feet in width. The display device may have a housing which is four feet in depth. The large size of the screen allows a large amount of information to be conveyed in the form of an electronic bulletin board.

In one embodiment of the present invention a plurality of data sources are provided at least two of which produce different types of data. Preferably one or more windows each comprising data from a different data source, are produced on the screen at the same time. The windows on the screen are preferably arranged in a grid comprised of a plurality of rows and a plurality of columns.

A data source memory is typically provided for storing data from the data sources. A screen memory is also typically provided for storing data to be displayed on the screen of the display device.

The processor typically includes a speech recognition device for translating speech electrical signals into language signals and a language device for implementing language signals to modify a parameter of a window on the screen of the display device. The speech recognition device and the language device are preferably in the form of computer software stored in the processor and/or in memory.

The present invention eliminates the need for a mouse. Each window displays preferably different information, such as for example: the Dow Jones average and its 30 components, commodity prices, Treasury rates, foreign exchange rates, weather, sports, an amortization schedule, a conference room schedule, a picture telephone, a sample book, a tickler file, an Internet page, an index, a television signal, a radio signal, digital feed from Reuters or Knight-Ridder, or many other possible types of data or information.

Although other means of data entry can be used in conjunction with the voice data entry, such as mouse, keyboard, or gestures, voice data entry is preferred.

BRIEF DESCRIPTION OF THE DRAWINGS

FIG. 5 is a flow chart of an example of the operation of the voice recognition and display device apparatus of FIG. 1;

DETAILED DESCRIPTION OF THE DRAWINGS

Figure 1:
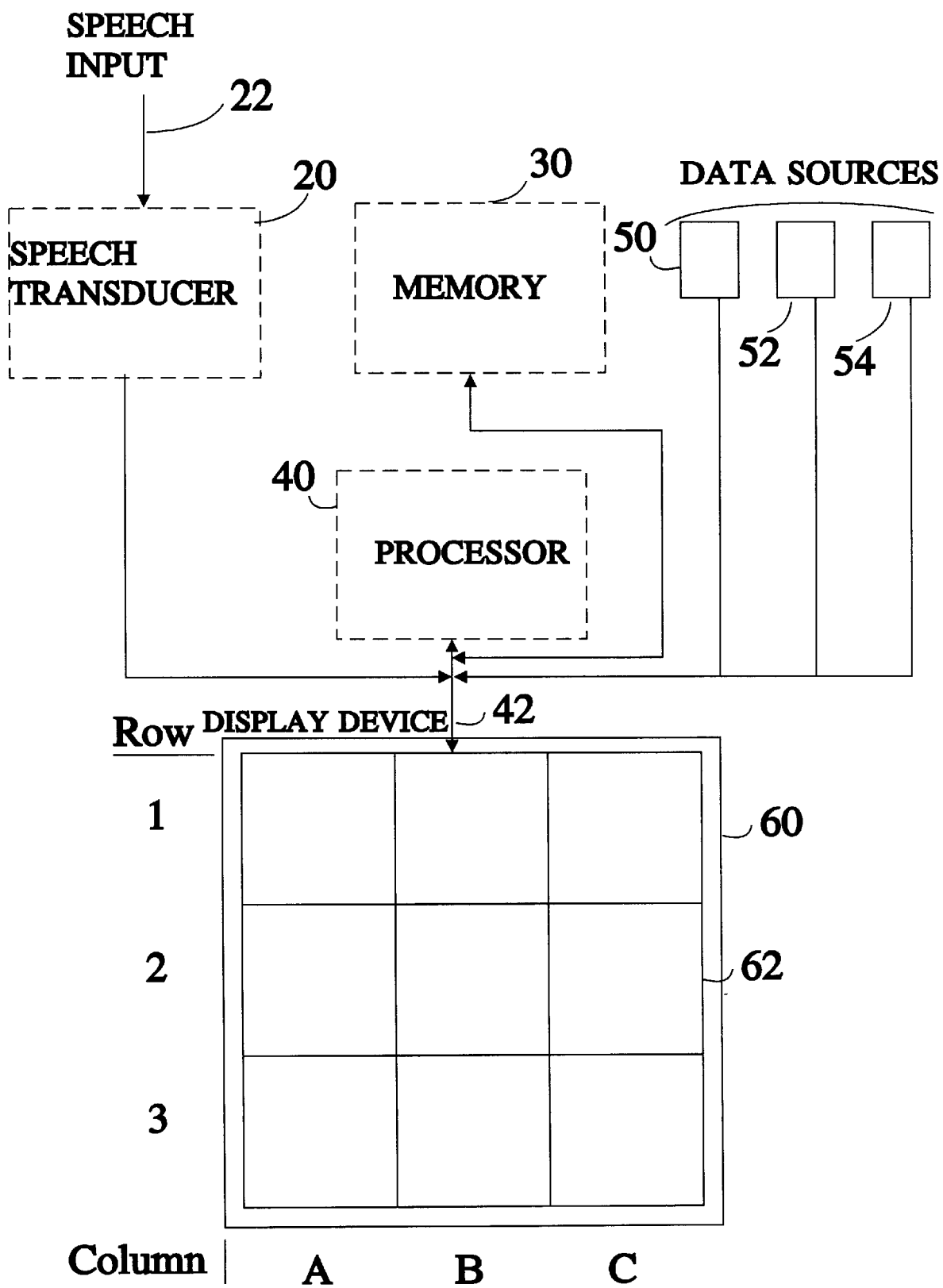
FIG. 1 illustrates a voice recognition and display device apparatus in accordance with one embodiment of the present invention.

FIG. 1 illustrates a voice recognition and display device apparatus 10 in accordance with a first embodiment of the present invention. Voice recognition and display apparatus 10 includes speech transducer 20, memory 30, processor 40, data sources 50, 52, and 54, and display device 60. The voice recognition and display apparatus 10 may be placed into one housing in which the speech transducer 20, memory 30, processor 40, and data sources 50, 52, and 54 are hidden, and only a screen 62 of the display device 60 can be seen by a user.

The speech transducer 20 has a speech input 22 and is connected at its output to the input/output bus 42 of the processor 20. The data sources also are connected at their outputs to the input/output bus 42 of the processor 40. The memory 30 and the display device 50 are also connected at their respective input/outputs to the input/output bus 42 of the processor 40.

Figure 3:
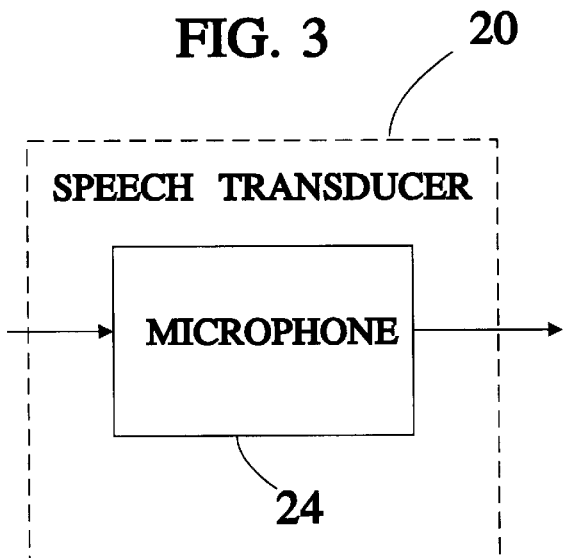
FIG. 3 shows a typical voice transducer for use with the apparatus of FIG. 1.
Figure 4:
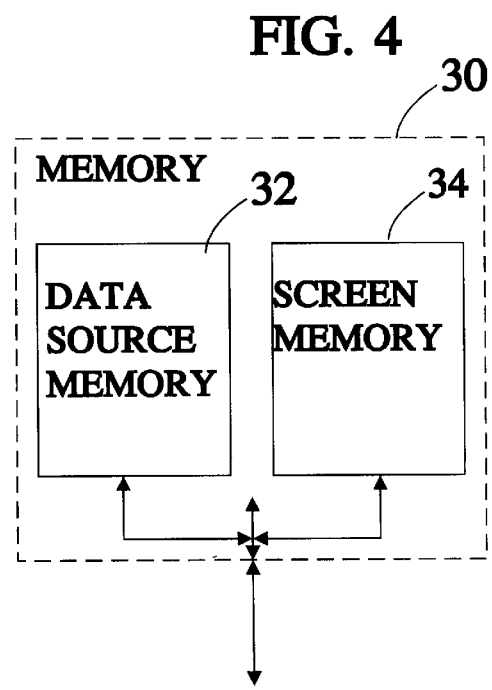
FIG. 4 shows a typical type of memory used for the memory of FIG. 1.

The speech transducer 20 is typically comprised of a microphone 24 as shown in FIG. 3. The speech transducer 20 may also be comprised of a group or a line or array of microphones. However, the speech transducer 20 may be comprised of any transducer or an array of transducers which changes sound into an electrical signal. The memory 30 may be any memory device known to those skilled in the art, including RAM, ROM, or any deviation thereof. The memory 30 typically includes data source memory 32 and screen memory 34 as shown in FIG. 4. Either of the data source memory 32 or the screen memory 34 may be implemented through such computer software programs as LOTUS 1-2-3, which can be stored in the processor 40 or in any memory device, and which allows a user to enter data into a grid or a matrix of rows and columns. The LOTUS 1-2-3 program is typically implemented by the processor 40. Other data base programs can alternatively or additionally be stored in the processor 40 or in any memory device, such as Sybase, Oracle, dBase, and DB2, which may allow for the management of data to be entered in data source memory 32 and screen memory 34. The screen memory 34 may include a video card which may have a 2 Megabyte memory. This amount of memory can be used for a screen 62 which is six feet in height, nine feet in width, and which has six text rows (where text columns differ from window columns) per inch and twelve text columns per inch, and where one byte is used for each text character, one byte is used for color, and one byte is used for text font.

Figure 2:
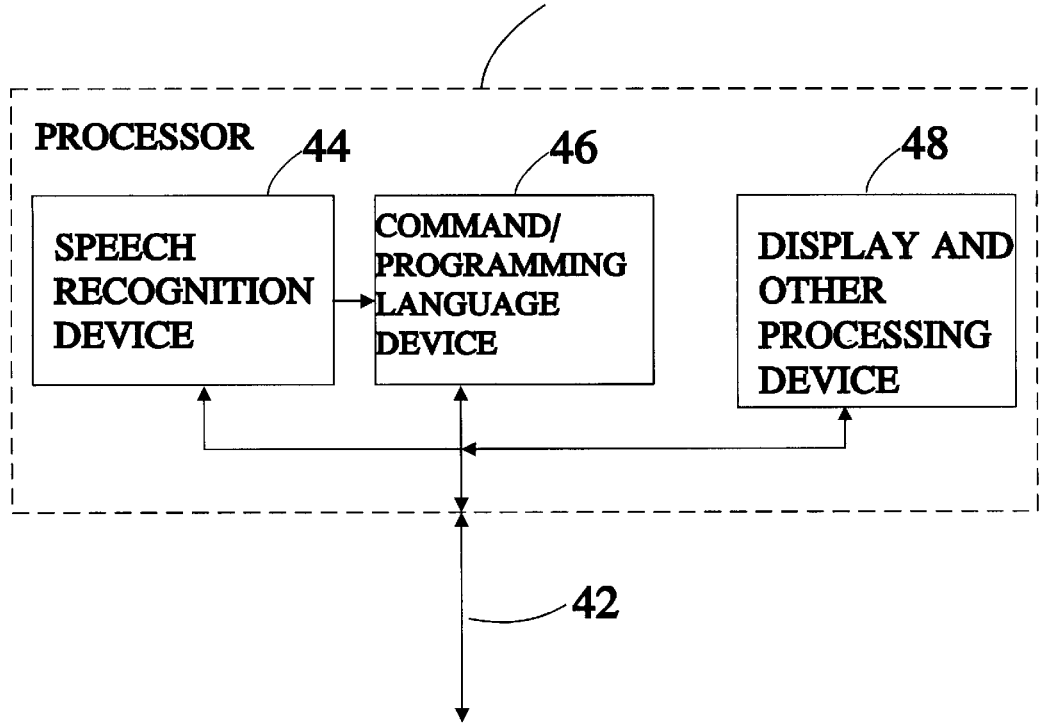
FIG. 2 shows a typical processor for use with the apparatus of FIG. 1.

An example of a typical processor 40 is shown in FIG. 2. The processor 40 includes a speech recognition device 44, a command/programming language device 46, and a screen and other processing device 48. The processor 40 may typically be comprised of an IBM compatible or Apple compatible computer, such as an IBM, Digital, or Packard Bell Pentium 100, which preferably should have at least 16–64 Megabytes of memory. The speech recognition device 44, command programming language device 46, and screen and other processing device 48 may each be comprised of computer software which can be stored in the processor 40 or at some other location, and this computer software is preferably implemented by the processor 40.

The speech recognition device 44 may include voice recognition software such as IBM, Kurzweil, Speech Systems, Verbex, or Xerox speech recognition software. The screen and other processing device 48 may include a computer operating system such as IMS Windows, or OS/2 and higher level programming languages such as Visual Basic, C++, Power Builder, and Delphi (By Borland).

The data sources 50, 52, and 54 may supply information from for example, a television signal, radio, live camera shot or picture telephone, from computers or any other information from any other source.

Speakers not shown may also be connected to the processor 40. If speakers are used computer software such as First Byte's ProVoice can be used to implement voice output or as it is more commonly known in the art, speech synthesis.

The display device 60 includes a screen 62. The screen 62 is shown separated into a three by three grid of nine windows in FIG. 1. The screen 62 has rows labelled "1", "2", and "3" and columns labelled "A", "B", and "C". The display device 60 is typically an LCD or CRT rear or front screen projector or some other large screen device, such as made by BARCO and AMPRO. The screen 62 should be depixelized if possible. Depixelization is known in the art and means that pixels are blurred together to avoid a grainy picture.

The screen 62 should typically have sufficient brightness for environments such as well lit office settings. The size of the screen 62 may be three feet by four feet or larger. A large screen is preferred so that the screen 62 can function as a bulletin board and can be seen easily and at a distance. The three by three grid is merely an example, any other grid dimensions are possible and are contemplated. The screen 62 is preferably a single screen and the border lines are merely representative of the outer boundaries of the windows. In fact, preferably there would be not be any border lines.

Figure 6A:
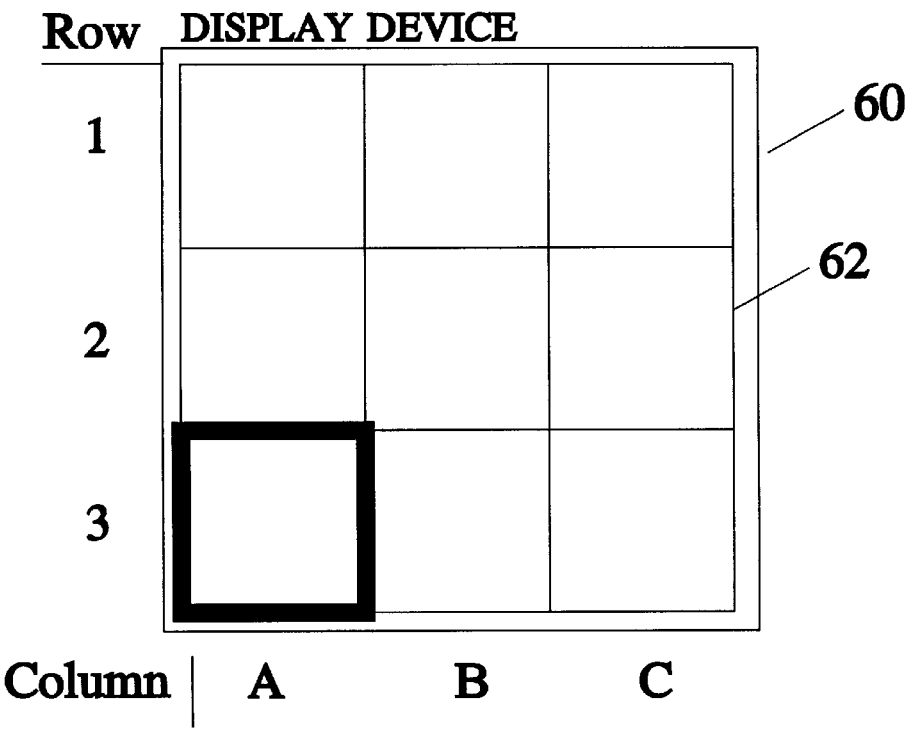
FIGS. 6A–6B show the movement of a highlighter or of the "focus" from one window to another.
Figure 6B:
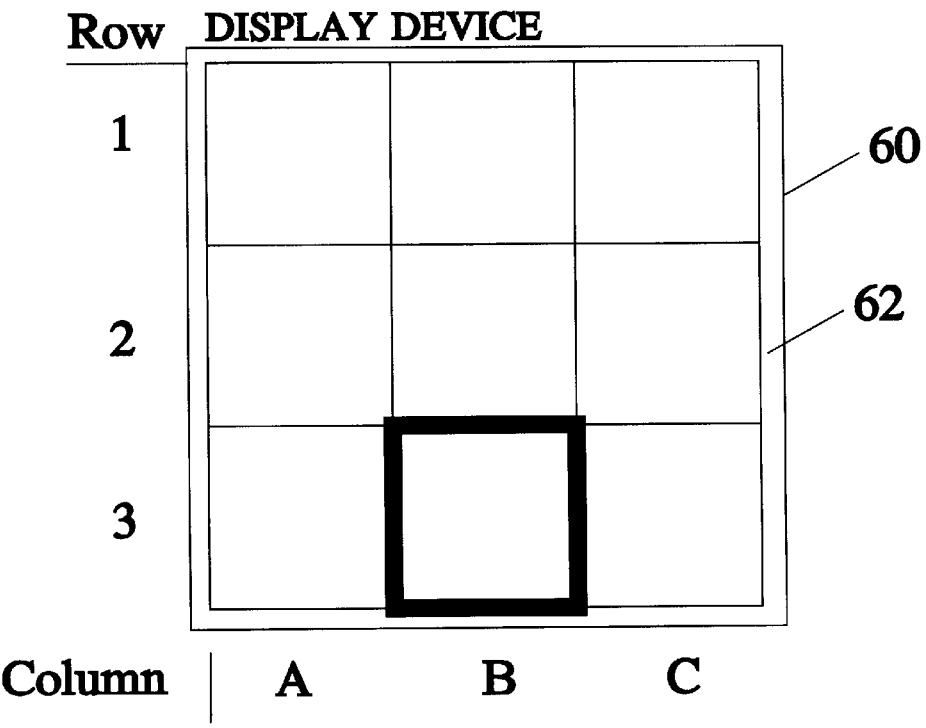

The operation of the voice recognition a nd display apparat us 10 of FIGS. 1, 2, 3, and 4 will be described with reference to the flow chart 100 in FIG. 5 and the screen 62 diagrams of FIGS. 6A and 6B. At step 102 of flow chart 100, a user makes a statement, such as for example "RIGHT". The spoken word "RIGHT" is changed into an electrical signal "RIGHT" by the speech transducer 20 at step 104. The electrical signal "RIGHT" is changed into a computer language signal "RIGHT" by the speech recognition device 44 of the processor 40 at step 106. At step 108 the command/programming language device 46 in the processor 40 implements the computer language signal "RIGHT" by issuing the appropriate instructions to cause the screen memory 34 in memory to be modified. The screen and other processing device 48 sends the contents of the screen memory 34 to the screen 62 of the display device 60 at step 110. The contents of the screen memory 34 may be sent to the display device 60 and the screen 62 at regular intervals regardless of whether a user has spoken. The screen 62, before and after the "RIGHT" command is executed, is shown in FIGS. 6A and 6B, respectively. Before the "RIGHT" command is executed the window in row 3 and column A is highlighted. After the "RIGHT" command is executed the window in row 3 column B is highlighted. At step 112 the loop is repeated by returning to step 102 and waiting for the next user statement.

A command and programming language, which can be implemented in the command/programming language device 46 of the processor 40, will be described in accordance with an embodiment of the present invention. This command and programming language allows the customizing of windows, such as windows A1, A2, A3, etc., shown on screen 62 of display device 60 in FIG. 1, and the retrieving of data from memory such as memory 30.

Command and Programming Language

Command and Programming Language statements provided in accordance with an embodiment of the present invention will be described in the following table. The command or statement, is shown in the left column of the table and the actions executed on the right, along with in some cases an example. If an expression in the command or statement appears in all capital letters and is not in closed parenthesis, it means that a user must state that exact expression to execute the command or statement. If an expression in the command or statement appears in brackets [ ], it means that a user must make an utterance that satisfies what that expression describes. Where a slash, such as "/", appears, it means that a choice must be made between two or more expressions. An expression appearing in capital letters in parenthesis is optional. In the table, the "window with the focus", is a window, such as the window in row 3 and column A of FIG. 6A, which is highlighted and is preferably capable of being manipulated at a particular instant. An "application" as referred to in the table, is typically a particular computer program for manipulating data, the data of which is being displayed in a window. Examples of different types of data to be displayed include: television signal data, word processing data, radio signal data, and spread sheet data. Examples of "applications" include word processing computer programs such as Word Perfect, data base programs, spreadsheet programs, calendaring programs, and live signal feeds. Each application preferably displays and manipulates a different type of data.

COMMAND LANGUAGE

| COMMAND | ACTIONS |
|---|---|
| AMEND [filename] | Tells the processor 40 that the filename in the application in the window with the focus, such as the window in row 3 and column A of FIG. 6A, is about to have information changed which should be saved to memory 30. Ex: AMEND CUSTOMERFILE Allows data to be changed in customer file. |
| [a,n] | This command puts the focus on the window with the coordinates "a", "n", where "a" is a letter corresponding to a window column and "n" is a number corresponding to a window row of the screen 62 shown in FIG. 1. Ex: A1 (puts the focus on window A1) |
| BACKGROUND [pattern/color/other] | Changes the color, pattern, or some other characteristic of the background (non-text portion) for windows without the focus. Ex: BACKGROUND BLUE (background of windows without the focus on the screen 62 changed to blue) |
| BEGIN WINDOW or BEGIN PAGE | Displays the first page of the application in the window which has the focus. |
| BEGIN SCREEN | Moves the focus to the window in the upper left hand corner, such as the window in Row 1, column A, of FIG. 6A. |
| BIGGER | Window with the focus gets larger, for example by multiplying length and width by a factor such as 1.414 |
| BOTTOM WINDOW or BOTTOM PAGE | Displays the last page of the application in the window which has the focus. |
| BOTTOM SCREEN | Moves the focus to the window in the lower right hand corner. |
| [caption] [IS/=] [value] | The item [caption] is assigned a value. Ex: PRINCIPAL IS $28,000. |
| CHANGE | Same as AMEND |
| COMPUTE | Invokes a calculation in the window with the focus. Ex: COMPUTE 55 TIMES 13 (Displays this calculation and the result on the display device screen) |
| CONTRACT | Window with the focus gets smaller, may divide width and length by 1.414. |
| DISPLAY [filename] | Causes application in window with focus to access a data file and to display the first page of it on the screen 62 in the window with the focus. |
| DOWN (n) WINDOW(S) or DOWN (n) PAGE(S) | Displays the next page of the application in the window with the focus. The letter "n" stands for a number of windows or pages down. |
| DOWN (n) SCREEN(S) | Moves the focus to the window downward or to the window at the top in the column to the right if already at the bottom row. |
| DRILL DOWN ON [line item name, columnar header] | Data displayed at a line and a columnar heading within the window with the focus is broken down into its components and displayed in the same window. Ex: DRILL DOWN ON NEW ENGLAND (Displays sales figures for Maine, Vermont, and Rhode Island) |
| EDIT [filename] | Same as CHANGE and AMEND. |
| END WINDOW or END PAGE | Displays the last page of the document in the window which has the focus. |
| END SCREEN | Focus goes to the window in the lower right hand corner of the screen. |
| ERASE [filename] | Deletes a File of the application in the window with the focus. |
| ERASE FROM [start] TO [finish] | Removes data within a file of the window with the focus. Ex: ERASE FROM IN THE COURSE TO EVENTS (removes data in document in application with the focus from "IN THE COURSE" to "EVENTS") |
| EXPAND | See BIGGER |
| FOREGROUND [color/font/other] | Changes foreground (the text portion) of windows without the focus to different color or font. |
| (FRONT) CENTER | Brings window with focus to center of the screen. |
| GET [filename] | Display the first page of the named file in the window with the focus. |
| GROW | See BIGGER |
| INDEX | Gives focus to window with index. The index preferably indicates what all of the other windows are. Generally the window with the index is located in the bottom right hand corner. Thus for FIG. 6A, the window at column C, row 3 would have the index. Could alternatively have table of contents in upper left hand corner of screen 62. |
| keyword | Gives the focus to the window corresponding to the keyword. Ex: "weather" would give the focus to the window which may contain present and forecasted weather for a number of cities. |
| LEFT (n) WINDOW(S) or LEFT (n) PAGE(S) | Displays the data toward the left of the document in the application in the window which has the focus. The letter "n" stands for a number of windows or pages. |
| LEFT (n) SCREEN(S) | Moves the focus to a window to the left or to the window the farthest to the right in the row above the present row if there are no windows to the left in this row. |
| MAIL [filename] TO [userid] | Electronic mails a file in the application with the focus to the given userid or to a device. |
| MODIFY | see CHANGE |

COMMAND LANGUAGE

| COMMAND | ACTIONS |
|---|---|
| PRINT [filename/page] (TO printer) | Prints the file or page in the application in the window with the focus to a specific printer. |
| RECOMPUTE [window/screen/page] | RECOMPUTE - For example would recompute the amortization schedule if the interest rate changes, if we are in such an application. |
| RECORD | Start recording what is said in a file. (The focus should be on a recording application) |
| RESET WINDOW | Put window with the focus back to default settings. |
| RESET SCREEN | Put all windows back to default settings. |
| RIGHT (n) WINDOW(S) or RIGHT (n) PAGE(S) | Displays the next page of the application in the window which has the focus. |
| RIGHT (n) SCREEN(S) | Moves the focus to the window to the right or if no more windows to the right, to the leftmost window in the lower row. |
| ROTATE | Invert the rows and columns. |
| SCROLL | Preferably scrolls in the last direction selected such as UP or DOWN. |
| SCROLL (n) UP | See UP WINDOW |
| SCROLL (n) DOWN | See DOWN WINDOW |
| SCROLL (n) LEFT | See LEFT WINDOW |
| SCROLL (n) RIGHT | See RIGHT WINDOW |
| SHRINK | See CONTRACT |
| SMALLER | See CONTRACT |
| SUMMARIZE (BY) [axis label] | Changes the data displayed in a single window into broader information. Ex: SUMMARIZE REGION (If the REGION window contained sales figures for New York, New Jersey, and New England, this command may display figures for broader regions such as the North East, Carolinas, and Florida; the totals for the eastern U.S. may be displayed also in the window on the last line) |
| TAKE DICTATION | Start storing the text of what is said in a file in the application in the window which has focus. (It is preferred that the focus is on an E-Mail, dictation, or similar application) |
| TOP WINDOW or TOP PAGE | See BEGIN WINDOW or BEGIN PAGE |
| TOP SCREEN | See BEGIN SCREEN |
| UP (n) WINDOW(S) or UP (n) PAGE(S) | Moves what is displayed in the window upwards in the document. |
| UP (n) SCREEN(S) | Moves the focus to the window above or if at the top to the bottom row in the previous column. |

The command/programming language may have some of the following programming language statements which are followed by an explanation of actions executed in response to these statements, as well as in some instances, examples. The programming language statements are contemplated to be implemented by a programmer whereas the command language statements are contemplated to be implemented by a user. However, either of the two statements can be implemented by users or programmers.

PROGRAMMING LANGUAGE

| STATEMENTS | ACTIONS |
|---|---|
| ACCEPT (INPUT) [varname] | The item [varname] can be assigned a value by the user. Ex: ACCEPT INPUT Principal (program will expect the user to utter a value for varname ("principal") |
| [a,n] | This identifies a window with a column coordinate of "a", which is a letter, and a row coordinate of "n", which is a number. Ex: A1 (Identifies the window A1) |
| [assignment statement] | A numeric or alphanumeric computation. Ex: MONTHLY INTEREST EQUALS PRINCIPAL TIMES INTEREST RATE DIVIDED BY 1200 |
| CALCULATOR | Places a calculator object in the window with the focus. |
| CAMERA | Places a camera in the window with the focus. |
| CASE . . . ENDCASE | Typical programming construct for conditional execution found in every programming language. |
| CLEAR WINDOW or CLEAR PAGE | Blanks out the window with the focus. |
| CLEAR SCREEN | Blanks out the whole screen 62. |
| COLOR (FOREGROUND/BACKGROUND) | Makes the text or non-text (i.e. foreground or background) in the window with the focus a particular color. |
| CREATE (RECTANGULAR/WINDOW) FROM [a,n] TO [a,n] | Creates a window from the upper left coordinate programming matrix element to the lower right coordinate programming matrix element. |
| DIRECT ACCESS READ | DIRECT ADDRESS READ ex: ACCEPT CUSTOMERNAME; DIRECT ACCESS READ CUSTOMERFILE FOR CUSTOMER = CUSTOMERNAME (looks up customer name in that customer file in window with the focus) |
| DO . . . ENDDO | Typical Programming Construct for iterative programming execution. |
| EMAIL | Places electronic mail object in the window with the focus. |
| [filename] [IS/=] [name] | Equates a logical filename with a physical filename for command language. Ex: CUSTOMER IS DSA1: [VIS]CUSTOMER.FIL or Ex: CUSTOMER = C:\VIS\CUSTOMER.FIL |
| FONT | Makes text in the window with the focus a particular font. |
| gadget/object | Places an object called "gadget" in this window. (i.e. whatever object or gadget is available) Ex. of gadgets: Picture telephone, tickler file, Internet Page, and Sample Book. |
| IF [conditions] [actions] ELSE [actions] ENDIF | Typical programming construct for conditional execution found in every programming language. |

-continued

| PROGRAMMING LANGUAGE | |
|---|---|
| STATEMENTS | ACTIONS |
| ON CHANGE OF [varname] RECOMPUTE | Tells program to recalculate everything in the window with the focus when the item [varname] is modified. |
| PITCH | Makes text in the window with the focus a particular size. |
| RADIO (STATION/ FREQUENCY) | Places a radio object in a the window with the focus. ex: RADIO WNEW FM or RADIO FM 102.7 |
| REFRESH EVERY [n] [SECONDS/MINUTES/ HOURS/DAYS/MONTHS/ YEARS] | Tells system when to refresh data in data source memory 32 or in screen memory 34. Important where "live" data feeds are used. |
| SEQUENTIAL READ | Reads file sequentially while something is true. SEQUENTIAL READ WHILE NOT EOF reads file until end of file marker. |
| SIZE | Makes text in window with the focus a particular size. |
| START MACRO [statements] END MACRO | To begin and end a block of statements to be executed when invoked. |
| TV (STATION/CHANNEL) | Places a Television object in the window with the focus. ex: TV WPIX ex: TV 11 |
| [varname] ACCEPT INPUT | Item with caption varname is expected to be assigned a value by user. Ex: Principal ACCEPT INPUT |
| VMAIL | Places a Voice Mail object in the window with the focus. |
| WORD PROCESSOR | Places a word processor object in the window with the focus. |

The term "connected" is used in a broad sense in this application and includes operative connections between wireless devices and terminals. Inputs and outputs do not have to be distinctly supplied and some ports or terminals may function as both outputs and inputs.

Figure 7:
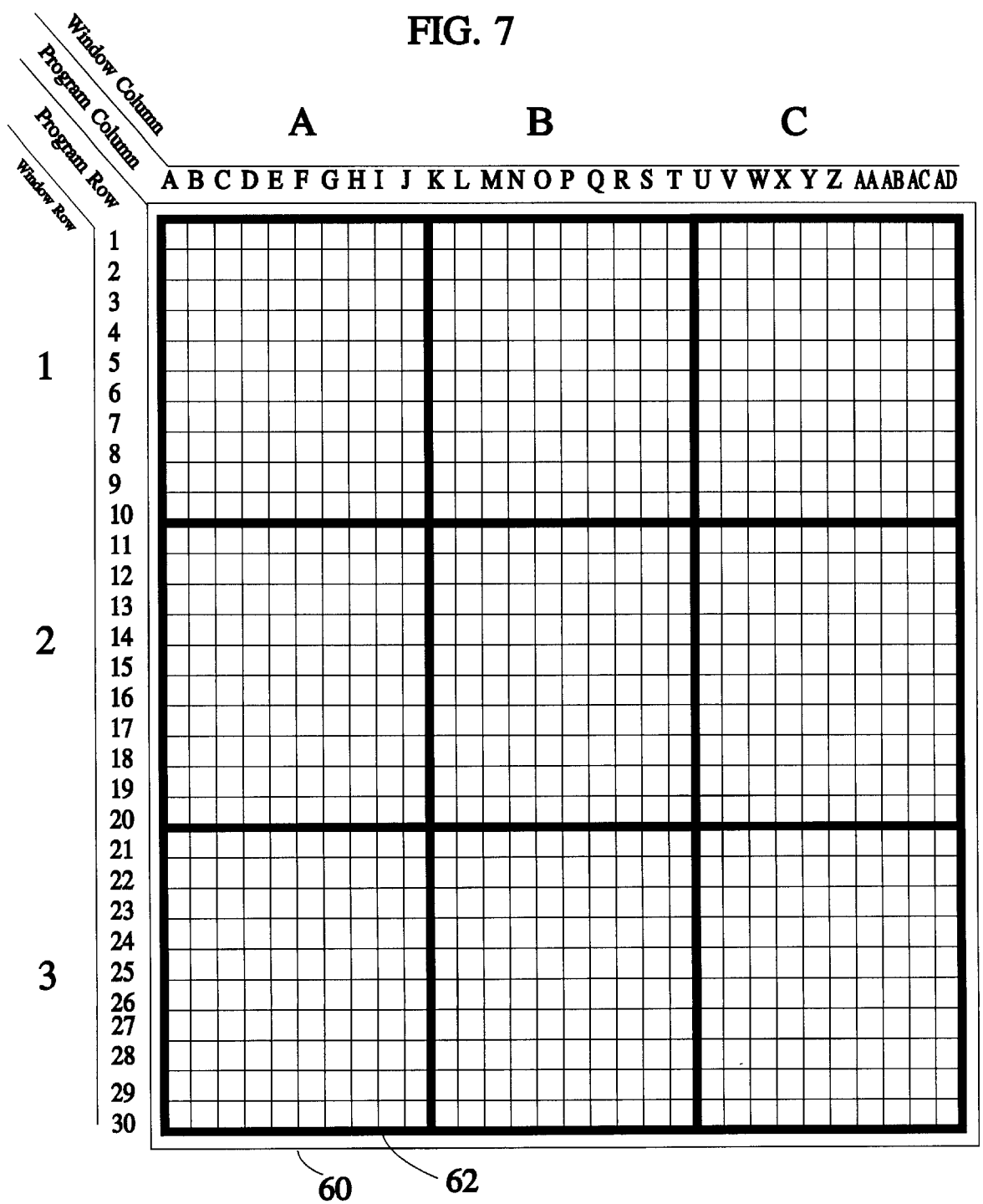
FIG. 7 is an illustration of a programming grid versus the user or command grid.

FIG. 7 shows an illustration of the screen 62 of the display device 60. The screen 62 is grouped in two matrices: one is the user window matrix and is a three by three matrix comprised of three rows "1", "2", and "3"; and three columns "A", "B", and "C". The other matrix is a 30×30 programming matrix comprised of thiry rows and thirty columns. The FIG. 7 illustration is intended to show that the user or window matrix can be changed into any form allowed by the programming matrix. This means, that for example, rows 1 through 20 and columns A through T of the programming matrix can constitute a single user's window A1. Any combination of programming matrix units can constitute a window.

EMBODIMENT USING VISUAL BASIC PROGRAM

In one embodiment, the windows can be created and manipulated on a screen, such as screen 162, shown in FIGS. 8A–8D by using a computer software program called Visual Basic, which may be implemented by and/or be stored in the processor 40. In this embodiment a first form, a second form, a third form, and a fourth form, as shown in FIGS. 8A–8D, can be displayed on the screen 162 of the display device 160. The first form is a three by four grid, the second form is a three by four grid with a central window 164 overlaying the grid, the third form is a three by four grid with a larger central window 166 overlaying the three by four grid, and the fourth form is a three by four grid with a larger central window 168 overlaying the three by four grid.

Figure 8A:
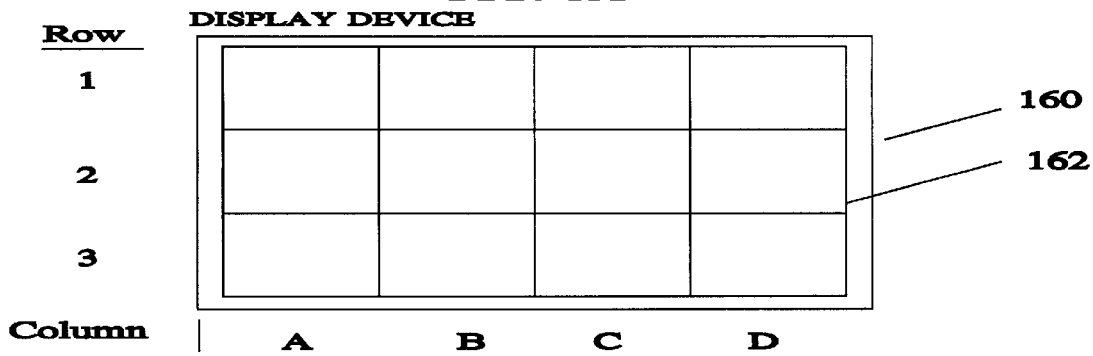
FIGS. 8A, 8B, 8C, and 8D show first, second, third, and fourth forms of what is displayed on a screen 162 in one embodiment of the present invention.
Figure 8B:
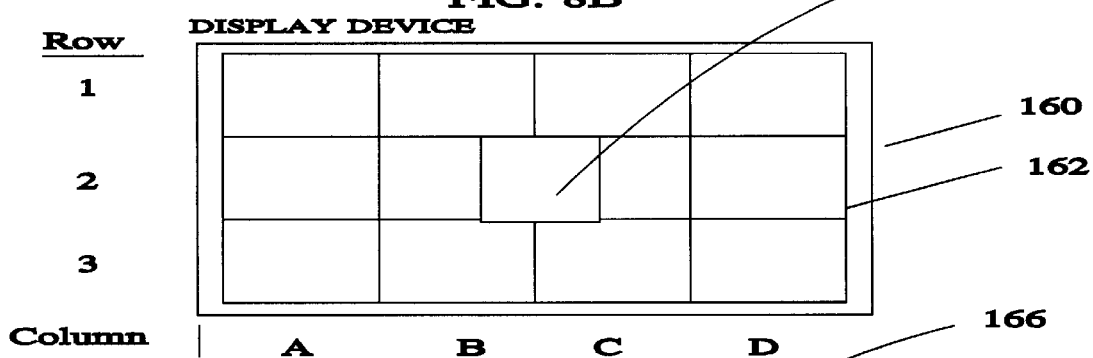
Figure 8C:
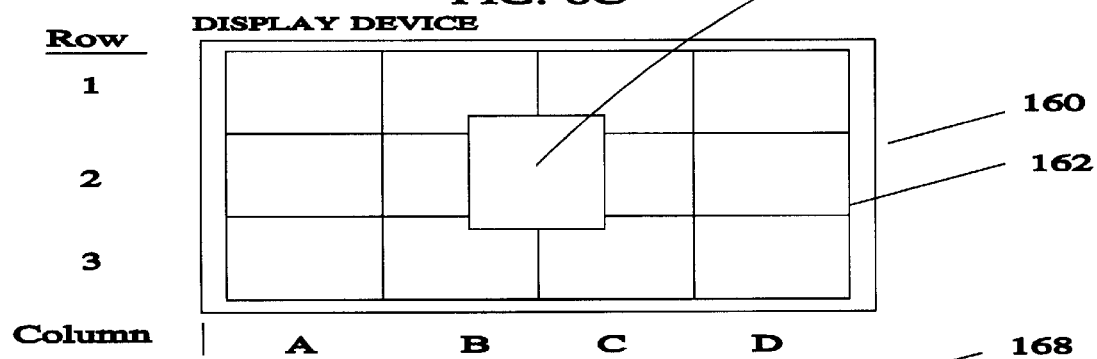

The following is an example of a VISUAL BASIC program for implementing the embodiment shown by FIGS. 8A–8D. Computer instructions are shown in bold type, while comments concerning the instructions are shown in normal type following a semicolon. Summary statements may also be placed prior to code and are shown in all capital letters. In this embodiment, each window such as window A1 in FIG. 8A, is constructed as a textbox through VISUAL BASIC programming.

VI₁ ~~NING~~

I. SPEECH OUTPUT

*The below functions point to the files containing the code*

*concerning speech synthesis and list the parameters which are passed from the function to the calling programs below.*

```
' ================================================================
'
'                        PROVW_VB.TXT
'
'                  Visual Basic DLL Interface
'                             to
'                     ProVoice for Windows
'
'
'
'
'                  Copyright (c) 1992 First Byte
' ================================================================
```

Declare Function OpenSpeech Lib "\provw21\fbvspch.dll" (ByVal hWnd%, ByVal mode%, ByVal speechFont&) As Long Declare Function CloseSpeech Lib "\provw21\fbvspch.dll" (ByVal lpSCB&) As Integer Declare Function Say Lib "\provw21\fbvspch.dll" (ByVal lpSCB&, ByVal phrase$) As Integer Global lpSCB As Long;

*Allows speech synthesis (voice output) End*

II.        WHEN FORM 1 IS FIRST INVOKED (FIG. 8A)

Sub Form_Load (); *Start of Subroutine*

Load form2; *Copies second form into memory*

Load form3; *Copies third form into memory*

Load form4; *Copies fourth form into memory* lpSCB = OpenSpeech(ByVal 0, ByVal 0, ByVal 0&);   *Allows voice output*

End Sub *End of Subroutine*

*When form 1 is first invoked End*

III.  WHEN FORM 1 IS FIRST INVOKED AND SUBSEQUENTLY INVOKED

SUB T1_GotFocus ()

Unload form2; *Removes second form from memory*

Load form2; *Copies second form into memory*

Unload form3; *Removes third form from memory*

Load form3; *Copies third form into memory*

Unload form4; *Removes fourth form from memory*

Load form4; *Copies fourth form into memory*

T1.BackColor = &HFFFF&; *Background becomes yellow*

T1.ForeColor = &H0; *Text becomes black*

TFC.BackColor = T1.BackColor

TFC.LinkItem = T1.LinkItem

TFC.LinkTopic = T1.LinkTopic

23

```
    TFC.LinkMode = T1.LinkMode
    form2.TFC.BackColor = T1.BackColor
    form2.TFC.LinkItem = T1.LinkItem
    form2.TFC.LinkTopic = T1.LinkTopic
    form2.TFC.LinkMode = T1.LinkMode
    form3.TG1.BackColor = T1.BackColor
    form3.TG1.LinkItem = T1.LinkItem
    form3.TG1.LinkTopic = T1.LinkTopic
    form3.TG1.LinkMode = T1.LinkMode
    form4.TG2.BackColor = T1.BackColor
    form4.TG2.LinkItem = T1.LinkItem
    form4.TG2.LinkTopic = T1.LinkTopic
    form4.TG2.LinkMode = T1.LinkMode
```

*The statements above cause the text boxes in the centers of forms 1, 2, 3, and 4 to contain the same information as this text box.*

```
    retVal% = Say(lpSCB, ByVal "Dou Jones"); Say Dow Jones (1)
    retVal% = Say(lpscb, ByVal "47 15.51"); Say 4715.51
End Sub
```

*When form 1 is first invoked and subsequently invoked End*

IV. WHEN THE FIRST TEXT BOX (ROW 1, COLUMN A) LOSES THE FOCUS
```
Sub T1_LostFocus ()
    T1.BackColor = &H800000; Background becomes blue (2)
```

```
    T1.ForeColor = &HFFFF&; Text becomes yellow
End Sub

When the first text box loses the focus End

V.  WHEN THE SECOND TEXT BOX (ROW 2, COLUMN A) GETS THE FOCUS

Sub T2_GotFocus ()
    T2.BackColor = &HFFFF&
    T2.ForeColor = &H0&
    TFC.BackColor = T2.BackColor
    TFC.LinkItem = T2.LinkItem
    TFC.LinkTopic = T2.LinkTopic
    TFC.LinkMode = T2.LinkMode
    form2.TFC.BackColor = T2.BackColor
    form2.TFC.LinkItem = T2.LinkItem
    form2.TFC.LinkTopic = T2.LinkTopic
    form2.TFC.LinkMode = T2.LinkMode
    form3.TG1.BackColor = T2.BackColor
    form3.TG1.LinkItem = T2.LinkItem
    form3.TG1.LinkTopic = T2.LinkTopic
    form3.TG1.LinkMode = T2.LinkMode
    form4.TG2.BackColor = T2.BackColor
    form4.TG2.LinkItem = T2.LinkItem
    form4.TG2.LinkTopic = T2.LinkTopic
    form4.TG2.LinkMode = T2.LinkMode
```

```
    retVal% = Say(lpscb, ByVal "Job Openings")  (1)
End Sub
```

*When the second text box gets the focus End*

VI.        WHEN THE SECOND TEXT BOX LOSES THE FOCUS

```
Sub T2_LostFocus ()
    T2.BackColor = &H0&;   Background becomes black  (2)
    T2.ForeColor = &HFFFF&; Text becomes yellow
End Sub
```

*When the second text box loses the focus end.*

VII. WHEN THE "FRONT CENTER" TEXT BOX (FIG. 8B, WINDOW 164) GETS THE FOCUS

```
Sub TFC_GotFocus ()
    Through = 0; Programming trick called setting a switch
    TFC.Visible = True; This box in the center of form 1 is
invisible until the keys [Alt]N are pressed.
    Load form2
    form1.Hide; Form 1 is hidden but remains in memory
    form2.Show; Form 2 is revealed (shown on the screen)
End Sub
```

*When the "front center" text box gets the focus End*

VIII.        WHEN FORM 2 IS INVOKED (FIG. 8B)

Sub T1_GotFocus ()

If Through = 1 Then form1.T1.BackColor = &HFFFF& form2.Hide form1.Show

End If

End Sub

*When form 2 is invoked End*

IX. WHEN THE SECOND TEXT (ROW 2, COLUMN A) BOX GETS THE FOCUS

Sub T2_GotFocus ()

Unload form1

Load form1 form2.Hide form1.Show

End Sub

*When the second text box gets the focus End*

X.    WHEN THE "FRONT CENTER" TEXT BOX GETS THE FOCUS

Sub TFC_GotFocus ()

Through = 1

T1.BackColor = &HFFFFFF

```
    TFC.Visible = True
    TFC.BackColor = form1.TFC.BackColor
    TFC.LinkItem = form1.TFC.LinkItem
    TFC.LinkTopic = form1.TFC.LinkTopic
    TFC.LinkMode = form1.TFC.LinkMode
    form3.TFC.BackColor = TFC.BackColor
    form3.TFC.LinkItem = TFC.LinkItem
    form3.TFC.LinkTopic = TFC.LinkTopic
    form3.TFC.LinkMode = TFC.LinkMode
End Sub
```
*When the "front center" text box gets the focus End*

XI.     WHEN THE "FRONT CENTER" TEXT BOX LOSES THE FOCUS

```
Sub TFC_LostFocus ()
    Through = 1
End Sub
```
*When the "front center" text box loses the focus End*

XII. WHEN THE "GROW" TEXT BOX (WINDOW 166 IN FIG. 8C) GETS THE FOCUS

```
Sub TG1_GotFocus ()
    Through = 0
    TFC.Visible = True
```

```
    TG1.BackColor = TFC.BackColor
    TG1.LinkItem = TFC.LinkItem
    TG1.LinkTopic = TFC.LinkTopic
    TG1.LinkMode = TFC.LinkMode
    TFC.Visible = False
    TG1.Visible = True
    TG1.BackColor = &HFFFF&
    TG1.Visible = True
    Load form3
    form2.Hide
    form3.Show
End Sub
```

*When the "grow" text box gets the focus End*

XIII. WHEN FORM 3 (FIG. 8C) IS INVOKED

```
Sub TG1_GotFocus ()
    Through = 1
    T1.BackColor = &HFFFFFF
    TG1.BackColor = form2.TFC.BackColor
    TG1.LinkItem = form2.TFC.LinkItem
    TG1.LinkTopic = form2.TFC.LinkTopic
    TG1.LinkMode = form2.TFC.LinkMode
    TFC.Visible = False
    TG1.Visible = True
    TG1.BackColor = &HFFFF&
```

```
    TG1.Visible = True
End Sub
```
*When form 3 is invoked End*

XIV. WHEN THE "GROW" TEXT (FIG. 8C, WINDOW 166) BOX GETS THE FOCUS

```
Sub TG2_GotFocus ()
    TG2.BackColor = TG1.BackColor
    TG2.LinkItem = TG1.LinkItem
    TG2.LinkTopic = TG1.LinkTopic
    TG2.LinkMode = TG1.LinkMode
    TG1.Visible = False
    TG2.Visible = True
    Load form4
    form3.Hide
    form4.Show
End Sub
```
*When the "grow" text box gets the focus End*

XV.         WHEN THE "GROW" TEXT BOX LOSES THE FOCUS

```
Sub T1_LostFocus ()
    form4.Hide
    form1.Show
End Sub
```
*When the "grow" text box loses the focus End*

Figure 8D:
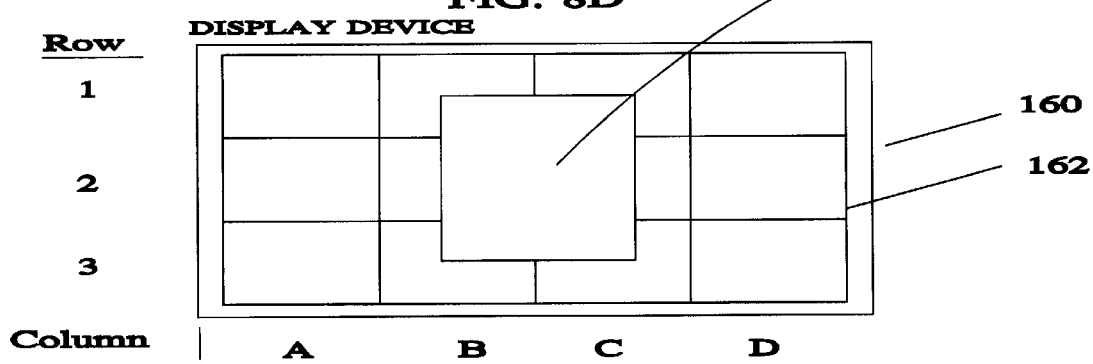

XVI. WHEN THE "MORE" or "BIGGER" TEXT BOX GETS THE FOCUS ON
FORM 4 (FIG. 8D, WINDOW 168)

```
Sub TG2_GotFocus ()
    Through = 1
    T1.BackColor = &HFFFFFF
    TG2.Visible = True
    TG2.BackColor = form1.TFC.BackColor
    TG2.LinkItem = form1.TFC.LinkItem
    TG2.LinkTopic = form1.TFC.LinkTopic
    TG2.LinkMode = form1.TFC.LinkMode
    TG1.Visible = False
    TG2.Visible = True
End Sub
```

*When the "more" or "bigger" text box gets the focus on form 4 End*

XVII. WHEN THE "MORE" or "BIGGER" TEXT BOX LOSES THE FOCUS

```
Sub TG2_LostFocus ()
 form4.Hide
 form1.Show
End Sub
```

*When the "more" or "bigger" text box loses the focus End*

<u>VISUAL BASIC CODE END</u>

PROPERTIES OF FORMS, LABELS, TEXTBOXES SET UP IN VISUAL BASIC

I. Forms (In this embodiment there are four forms, form1 in Fig. 8A, form2 in fig. 8B, form3 in fig. 8C, and form 4 in Fig. 8D.) The following shows the properties common to each form and which can be set by an operator using Visual Basic. As used in this patent application each "form" preferably takes up substantially all of the screen 162 shown in Figs. 8A-8D, and each form is comprised of a plurality of windows which are preferably arranged substantially in a grid of rows and columns.

| | |
|---|---|
| AutoRedraw | True |
| BackColor | &H00808000& |
| BorderStyle | 2 - Sizable |
| Caption | VIS |
| ClipControls | True |
| ControlBox | True |
| DrawMode | 13 - Copy Pen |
| Draw Style | 0 - Solid |
| DrawWidth | 1 |
| Enabled | True |
| FillColor | &H00000000& |
| FillStyle | 1 - Transparent |
| FontBold | True |
| FontItalic | False |

| | |
|---|---|
| FontName | MS Sans Serif |
| FontSize | 8.25 |
| FontStrikethru | False |
| FontTransparent | True |
| FontUnderline | False |
| ForeColor | &H000000FF& |
| Height | 13380 |
| HelpContextID | 0 |
| Icon | (Icon) |
| KeyPreview | False |
| Left | 90 |
| LinkMode | 0 - None |
| LinkTopic | Form1 |
| MaxButton | True |
| MDIChild | False |
| MinButton | True |
| MousePointer | 0 - Default |
| Name | Form1[1] |
| Picture | (none) |
| ScaleHeight | 12975 |
| ScaleLeft | 0 |
| ScaleMode | Twip |
| ScaleTop | 0 |
| ScaleWidth | 18690 |
| Tag | |
| Top | 1095 |

33

| | |
|---|---|
| Visible | True |
| Width | 18810 |
| WindowState | 0 - Normal |

[1]The "Name" property varies depending on which form we are setting up. (i.e. form1, form2, form3 or form4)

II. Labels    Labels in Visual Basic are information which users can't change. Each Form has a set of label properties which are defined.

| | |
|---|---|
| Alignment | 0 - Left Justify |
| AutoSize | False |
| BackColor | &H80000005& |
| BackStyle | 1 - Opaque |
| BorderStyle | 0 - None |
| Caption | &A [2] |
| DataField | |
| DataSource | |
| DragIcon | (none) |
| DragMode | 0 - Manual |
| Enabled | True |
| FontBold | True |
| FontItalic | False |

34

| | |
|---|---|
| FontUnderline | False |
| ForeColor | &H8000008& |
| Height | 855 |
| Index | |
| Left | 840 [3] |
| LinkItem | |
| LinkMode | 0 - None |
| LinkTimeout | 50 |
| LinkTopic | |
| MousePointer | 0 - Default |
| Name | L1 [4] |
| TabIndex | 0 [5] |
| Tag | |
| Top | 1320 [6] |
| Visible | True |
| Width | 855 |
| WordWrap | False |

[2]The caption varies depending on the text box region which is being set up. The captions for the fifteen textbox regions are &A, &B, &C, &D, &E, &F, &G, &H, &I, &J, &K, &L, &M, &N, and &O, respectively.

[3]The distance of the particular label from the left side of the screen depends on the textbox region (or window) being set up. The distances from the left side for the fifteen textboxes are 840, 840, 1680, 6480, 6480, 6480, 11280, 11280, 11160, 15840, 15960, 15960, 8760, 8760, and 8760, respectively. (numbers are in twips).

[4] Name of labels. The names for the fifteen labels (i.e. for the windows) are L1, L2, L3, L4, L5, L6, L7, L8, L9, LA, LB, LC, LFC, LG1, and LG2, respectively.

[5] 0 through 2n-1 where n = number of text boxes not counting ones in the center. In this case n=12, 0,1,2,3,...,23.

[6] The distances from top of the screen of the labels for the fifteen labels are 840, 840, 1680, 1680, 5880, 10320, 1440, 5880, 10440, 1560, 5880, 10440, 5880, 4920, and 6840, respectively.

TextBoxes (each form has 15 text boxes, 12 for the grid windows and 3 for the "front center", "grow", and "bigger" (or "more") windows. Each of the properties of these textboxes must be defined one at a time.

| | |
|---|---|
| Alignment | 0 - Left Justify |
| BackColor | &H00800000& [7] |
| BorderStyle | 1 - Fixed |
| DataField | |
| DataSource | |
| DragIcon | (none) |

36

| | |
|---|---|
| DragMode | 0 - Manual |
| Enabled | True |
| FontBold | True |
| FontItalic | False |
| FontName | MS Sans Serif |
| FontSize | 8.25 |
| FontStrikethru | False |
| FontUnderline | False |
| ForeColor | &H0000FFFF& |
| Height | 4335 [8] |
| HelpContextID | 0 |
| HideSelection | TrueIndex |
| Left | 0 [9] |
| LinkItem | a:a1..f17 [10] |
| LinkMode | 1 - Automatic |
| LinkTimeout | 50 |
| LinkTopic | 123W\|123r5w\work\vb1.wk4 [11] |
| MaxLength | 0 |
| MousePointer | 0 - Default |
| MultiLine | True |
| Name | T1 [12] |
| PasswordChar | |
| ScrollBars | 0 - None |
| TabIndex | 1 [13] |
| TabStop | True |
| Tag | |

37

Text

Top                0    [14]

Visible            True

Width              4695 [15]

[7] Background colors are Blue, Black, and Green for windows without focus in a patchwork pattern. Background color is yellow for window with focus and center window on forms 2, 3, and 4.

[8] Constant 4335 but often wouldn't be. TFC is 495 on form1.

[9] Distances of the fifteen textboxes from the left side of the screen are 0, 0, 0, 4680, 4680, 4680, 9360, 9360, 9360, 14040, 14040, 14040, 4200, 6000, and 4440 respectively. (This is for form1, the other forms are different)

[10] Lotus ranges from which the data found in the eleven other sources of data come from are: b:a1..b:d11, c:a1..c:e19, d:a1..d:e19, e:a1..e:21, f:a1..f:d16, g:a1..g:f20, h:a1..h:d15, i:a1..i:f15, j:a1..j:d19, and l:a1..l:c18, and o:a1..o:d21, respectively. The expression $x:c_1r_1 .. y:c_2r_2$, specifies a range of data in a lotus file or files, such that x and y are lotus sheets or files, $c_1$ is a column and $r_1$ is a row in the lotus x sheet, and $c_2$ is a column and $r_2$ is a row in the lotus y sheet.

[11] Constant 123W|123r5w\work\vb1.wk4 but ordinarily wouldn't be. All data in this example happens to be in one Lotus spread sheet, but wouldn't ordinarily be the case.

[12] The names for the fifteen textboxes are T1, T2, T3, T4, T5, T6, T7, T8, T9, TA, TB, TC, TFC, TG1, and TG2.

[13] 0 through 2n-1 where n = number of text boxes not counting ones in the center. In this case n=12, o,1,2,3,...,23.

[14] The distance of the fifteen textboxes form the top of the screen are 0, 4320, 8640, 0, 4320, 8640, 0, 4320, 8640, 0, 4320, 8640, 0, 3600, 2160 respectively.

[15] The width of each textbox in this example is a constant 4695 but doesn't necessarily have to be. TFC is 495.

KURZWEIL IMPLEMENTATION STEPS

The following shows how to use Kurzweil speech recognition software to implement an embodiment of the present invention.

*Click on:*
  Voice Menu
  Application Editor
Name it VIS2 (Product does this automatically since that is the name of the .EXE file invoked from the MS Windows File Run Text Box)

*Click on:*

Command Editor

Repeat until all phrases are defined

*Click on:*

Add

Spell word, coordinate, phrase, etc.

Specify that word is a command

Define keystroke (i.e.[Alt]A)

OK

Train All Words

You will be asked to repeat each word three times. Do it. This is preferably how all commands/programming language statments or utterances are defined.

The following list can be defined in one embodiment of the present invention using Kurzweil software. The spoken words are made the equivalent of keystrokes such as [Alt] A, and those keystrokes are used by the processor 40 to implement the appropriate computer instructions.

| Word | Keystrokes |
|------|------------|
| A1   | [Alt] A;  A1 ... D3 are spoken utterances by a user which give the focus and/or |

40

| | | highlighting to a particular window. |
|---|---|---|
| A2 | [Alt] B | |
| A3 | [Alt] C | |
| B1 | [Alt] D | |
| B2 | [Alt] E | |
| B3 | [Alt] F | |
| C1 | [Alt] G | |
| C2 | [Alt] H | |
| C3 | [Alt] I | |
| D1 | [Alt] J | |
| D2 | [Alt] K | |
| D3 | [Alt] L | |
| Alpha1 | [Alt] A | ; Alpha1 ... Delta3 are merely substitute expressions for A1 ... D3. |
| Alpha2 | [Alt] B | |
| Alpha3 | [Alt] C | |
| Bravo1 | [Alt] D | |
| Bravo2 | [Alt] E | |
| Bravo3 | [Alt] F | |
| Charlie1 | [Alt] G | |
| Charlie2 | [Alt] H | |
| Charlie3 | [Alt] I | |
| Delta1 | [Alt] J | |
| Delta2 | [Alt] K | |

| | | |
|---|---|---|
| Delta3 | [Alt] L | |
| Dow Jones | [Alt] A; | "Dow Jones" ... "Index" are spoken utterances which are also substitutes for A1 ... D3. These identify a window by the title or type of data to be displayed in the window. |
| Job Openings | [Alt] B | |
| Treasury Rates | [Alt] C | |
| Weather | [Alt] D | |
| Amortization Schedule | [Alt] E | |
| New Hires | [Alt] F | |
| Conference Rooms | [Alt] G | |
| Customers | [Alt] H | |
| Credit Committee | [Alt] I | |
| Commodity Prices | [Alt] J | |
| FX Rates | [Alt] K | |
| Index | [Alt] L | |
| Front Center | [Alt] M; | The function of these final utterances has already been explained. |
| Front | [Alt] M; | Loads form2 shown in Fig. 8B. |
| Center | [Alt] M | |
| Grow | [Alt] N; | Loads form3 shown in Fig. 8C. |

42

| | | |
|---|---|---|
| More | [Alt] O; | Loads form4 shown in Fig. 8D. |
| Bigger | [Alt] O | |
| Again | [Alt] O | |
| Reset | [Alt] B; | Reinvokes form1 and window A1 from form2, form3, and form4. |

I claim:

1. An apparatus comprising:

a speech transducer having an output;

a processor having an input and an output, the input connected to the output of the speech transducer; and a display device having an input connected to the output of the processor, the display device having a screen;

the processor adapted for producing a plurality of windows on the screen at the same time, at least two of the windows comprised of different types of data;

wherein the processor is adapted to receive speech signals from the speech transducer and to modify a parameter of one or more of the windows based on the speech signals; and wherein the processor responds to a first verbal command by moving a focus to a first application;

the processor responds to a second verbal command and a name of a first file when the first application has the focus, by displaying a portion of the first file in the first application, the processor responds to a third verbal command by moving the focus to a second application; and the processor responds to the second verbal command and a name of a second file, when the second application has the focus, by displaying a portion of the second file in the second application.

2. The apparatus of claim 1 wherein the processor is adapted to modify a parameter comprising the data within one or more windows.

3. The apparatus of claim 1 wherein the processor is adapted to modify a parameter comprising the size of one or more windows.

4. The apparatus of claim 1 wherein the display device is comprised of a rear or front screen projector.

5. The apparatus of claim 4 wherein the rear or front screen projector is comprised of a liquid crystal display rear or front screen projector.

6. The apparatus of claim 4 wherein the rear or front screen projector is comprised of a cathode ray tube rear or front screen projector.

7. The apparatus of claim 1 wherein the screen of the display device is greater or approximately three feet in length and greater or approximately four feet in width.

8. The apparatus of claim 1 and further comprising:

a first data source having an output at which a first type of data is produced, the output of the first data source connected to the input of the processor;

a second data source having an output at which a second type of data is produced, the output of the second data source connected to the input of the processor;

wherein the processor produces a first window on the screen of the display device comprised of the first type of data from the first data source and the processor produces a second window on the screen of the display device comprised of the second type of data from the second data source, such that the first and second windows are present on the display at the same time.

9. The apparatus of claim 8 further comprised of:

a data source memory having an output connected to the input of the processor, and an input connected to the data sources, the data source memory adapted for storing data from the first and second data sources; and wherein the processor is adapted for retrieving data from the data source memory and producing a plurality of windows on the screen at the same time based on the data stored in the data source memory, at least two of the windows comprised of different types of data.

10. The apparatus of claim 1 wherein the processor is adapted to produce the plurality of windows on the screen of the display device in the form of a grid.

11. The apparatus of claim 10 wherein the processor includes a voice input device having an input and an output;

a language device having an input connected to the output of the voice input device and an output;

wherein the voice input device is adapted to a receive a speech electrical signal from the speech transducer and to change it to a language signal and the language device implements the language signal to modify a window on the display.

12. The apparatus of claim 11 wherein:

the voice input device is comprised of voice recognition software; and the language device is comprised of language software.

13. The apparatus of claim 12 and wherein the language software is comprised of command language software stored in the processor.

14. The apparatus of claim 12 and wherein the language software is comprised of programming language software stored in the processor.

15. The apparatus of claim 1 further comprised of:

a screen memory having an output connected to the input of the processor, the screen memory adapted for storing different types of data; and wherein the processor is adapted for retrieving data from the screen memory and producing a plurality of windows on the screen at the same time based on the data stored in the screen memory, at least two of the windows comprised of different types of data.

16. An apparatus comprising:

a speech transducer having an output;

a processor having an input and an output, the input connected to the output of the speech transducer; and a display device having an input connected to the output of the processor, the display device having a screen;

the processor adapted for producing a plurality of windows on the screen at the same time, at least two of the windows comprised of different types of data;

wherein the processor is adapted to receive speech signals from the speech transducer and to modify a parameter of one or more of the windows based on the speech signals; and wherein the processor arranges the plurality of windows in a grid of a plurality of rows and a plurality of columns, such that each window is defined by a particular row and column designation.

17. The apparatus of claim 16 and further:

wherein the processor responds to a verbal command designating a particular row and column designation by moving a focus to the window with that particular row and column designation.

18. An apparatus comprising:

a speech transducer having an output;

a processor having an input and an output, the input connected to the output of the speech transducer; and a display device having an input connected to the output of the processor, the display device having a screen;

the processor adapted for producing a plurality of windows on the screen at the same time, at least two of the windows comprised of different types of data;

wherein the processor is adapted to receive speech signals from the speech transducer and to modify a parameter of one or more of the windows based on the speech signals;

wherein the processor moves a focus to a first window in response to a first verbal command; and wherein the processor moves the first window with the focus to the center of the screen in response to a single spoken word.

19. An apparatus comprising:

a speech transducer having an output;

a processor having an input and an output, the input connected to the output of the speech transducer; and a display device having an input connected to the output of the processor, the display device having a screen;

the processor adapted for producing a plurality of windows on the screen at the same time, at least two of the windows comprised of different types of data;

wherein the processor is adapted to receive speech signals from the speech transducer and to modify a parameter of one or more of the windows based on the speech signals;

wherein the processor moves a first window to the center of the screen in response to a first spoken command, such that the first window is displayed in the center of the screen; and wherein at least one further window is displayed, at least partially, on the screen, at the same time the first window is displayed in the center of the screen and the first window and the one further window contain different applications.

20. The apparatus of claim 19 and wherein:

the first window when displayed in the center of the screen is overlayed on top of a grid of further windows, the grid comprising a plurality of rows and columns, such that a plurality of further windows can be seen, at least partially, when the first window is displayed in the center of the screen.

* * * * *